United States Patent [19]

Kawai

[11] Patent Number: 4,561,677
[45] Date of Patent: Dec. 31, 1985

[54] PASSIVE SEAT BELT DEVICE

[75] Inventor: Osamu Kawai, Fujisawa, Japan

[73] Assignee: NSK-Warner K. K., Japan

[21] Appl. No.: 581,718

[22] Filed: Feb. 21, 1984

[30] Foreign Application Priority Data

Feb. 25, 1983 [JP] Japan .............................. 58-25921[U]

[51] Int. Cl.[4] ............................................. B60R 21/10
[52] U.S. Cl. .................................. 280/804; 280/807; 318/334
[58] Field of Search ............... 280/801, 802, 804, 807; 318/334, 500, 504, 434

[56] References Cited

U.S. PATENT DOCUMENTS

| 4,156,162 | 5/1979 | Warfield et al. | 318/434 |
| 4,227,129 | 10/1980 | Brooks | 318/334 |
| 4,362,321 | 12/1982 | Volk et al. | 280/804 |
| 4,363,501 | 12/1982 | Takada | 280/804 |
| 4,394,635 | 7/1983 | Sato | 280/804 |

Primary Examiner—Joseph F. Peters, Jr.
Assistant Examiner—Ross Weaver
Attorney, Agent, or Firm—Shapiro and Shapiro

[57] ABSTRACT

A passive seat belt device in which a runner member to which a part of webbing is connected is moved on a rail member by being driven by a driving motor and thereby can assume a seat occupant restraining position and a seat occupant liberating position has a device for detecting the ambient temperature and a device for controlling the driving force of the motor. The driving force of the motor is increased when the ambient temperature is low and the driving force is decreased when the ambient temperature is high.

6 Claims, 6 Drawing Figures

PASSIVE SEAT BELT DEVICE

BACKGROUND OF THE INVENTION

1. Field of the Invention

This invention relates to a passive seat belt device, and more particularly to improvements in the driving motor thereof.

2. Description of the Prior Art

There are known two types of passive seat belt device (also called automatic seat belt device), i.e., the two-point type and the three-point type, and in any of these types, a part of webbing is connected to a runner member movable on a rail member. The runner member may be moved on the rail member in response to opening or closing of the door by a driving motor through a driving member such as a geared wire, a tape or the like, whereby the webbing can assume a seat occupant restraining position and a seat occupant liberating position.

In this case, due to the characteristics of the driving motor and the driving member, the sliding resistance of the runner member is variable owing to temperature and generally, the sliding resistance tends to decrease during the time of high temperature and to increase during the time of low temperature. Thus, the runner member moves on the rail member at a relatively high speed during the time of high temperature when the load to the motor may be small, and moves on the rail member at a low speed during the time of low temperature when the load is great. Accordingly, it is not suitable to determine the speed of movement of the runner member, namely, the characteristic of the driving motor, with the time of low temperature or the time of high temperature as a reference, and even if the speed of movement of the runner member is determined with the normal temperature as a reference, the runner member will move at a speed lower than a set value during the time of low temperature and will move at a speed higher than the set value during the time of high temperature. Particularly, under high temperature conditions, if the runner member moves at a high speed, it will collide against the stopper on the rail member at the forward and backward ends of its movement stroke, and the shock resulting therefrom may damage a driving member connecting the motor to the runner member (for example, a geared wire) and the connecting portion driving device thereof (for example, the gear of the motor). Also, under low temperature conditions, the sliding resistance of the runner member may become too great for the runner member to slide well.

SUMMARY OF THE INVENTION

In view of the above-noted situations, the present invention intends to provide a passive seat belt device in which the variation in the speed of movement of the runner member owing to any variation in the ambient temperature is reduced.

To achieve such object, in the present invention, means for detecting the ambient temperature is provided in an electric circuit for driving the driving motor while, on the other hand, the torque characteristic relative to the number of revolutions of the motor is controlled by control means so as to be great when the ambient temperature is low and to be small when the ambient temperature is high.

The invention will become more fully apparent from the following detailed description thereof taken in conjunction with the accompanying drawings.

DESCRIPTION OF THE PREFERRED EMBODIMENTS

Figure 1:
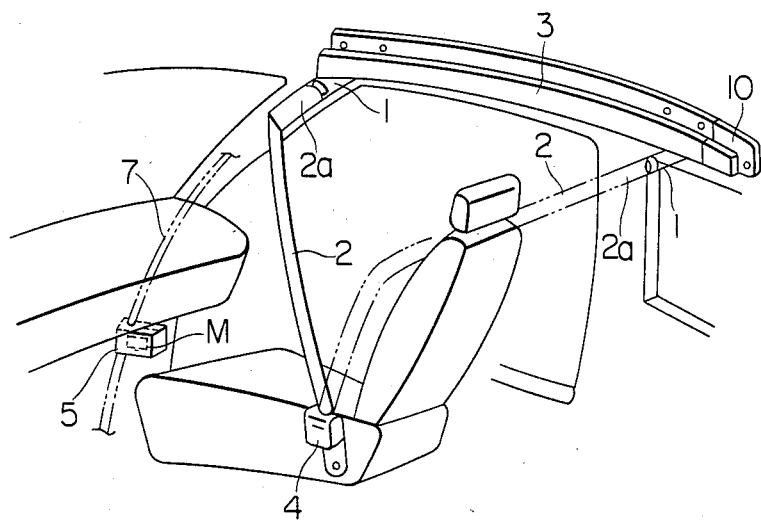
FIG. 1 is a perspective view showing a two-point type passive seat belt device as an object to which the present invention is applied.

Embodiments of the present invention will hereinafter be described. In FIG. 1, an anchor 1 which is a runner member may slide along a rail 3 extending between a seat occupant liberating position (indicated by solid lines) and a seat occupant restraining position (indicated by dots-and-dash lines) in response to opening or closing of the door, and this sliding movement may be effected by a DC motor M within a receiving box 5 through the movement of a geared wire (not shown) in a tube 7.

Further, in the seat belt system shown in FIG. 1, webbing 2 extends out from a retractor 4 secured to the inner side of the seat and passes to the anchor 1, and the vicinity of the anchor-secured portion of the webbing 2 provides a so-called neck-cut preventing portion 2a which eliminates a phenomenon of ear-touch or hanging against the seat occupant and also improves the getting-on-and-off characteristic. A latch device 10 for latching the anchor 1 when it has come to the seat occupant restraining position is provided at the rearmost end of the rail 3, but this is not directly related to the present invention and therefore need not be described.

Figure 2:
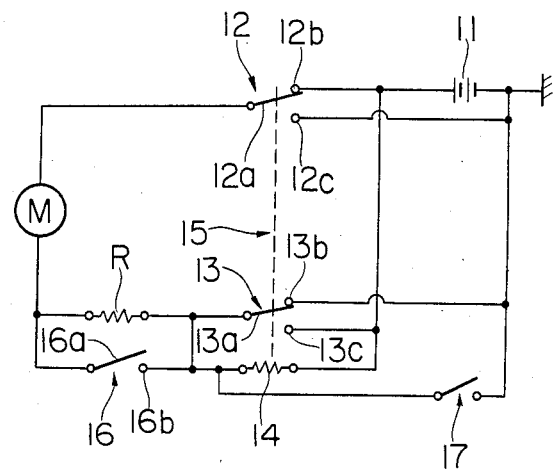
FIG. 2 is a view of an electric circuit showing a first embodiment of the present invention.

In an electric circuit for driving the DC motor M, as shown in FIG. 2, switches 12, 13 and a relay 15 including a coil 14 are disposed between a power source 11 and the motor M, and a resistor R and a switch 16 including a bimetallic contact piece 16a are parallel-disposed and further, a door switch 17 adapted to be closed and opened in response to opening and closing of the door is disposed.

Operation of the present embodiment will now be described. First, when the ambient temperature (as measured near the rail member, for example) is relatively low, the bimetallic contact piece 16a is in contact with a terminal 16b due to its characteristic and the switch 16 is closed. When in this state the seat occupant takes his seat and closes the door, the switch 17 is opened in response thereto and the coil 14 of the relay 15 is deenergized. As a result, the contact piece 12a of the switch 12 comes into contact with a terminal 12b and the contact piece 13a of the switch 13 comes into contact with a terminal 13b and a closed loop is completed and thus, the motor M is driven by the power source 11. The resistor R is not included in this closed loop and the voltage drop by the resistor R does not occur, and the voltage of the power source 11 is intactly applied to the motor M. At this time, the torque characteristic relative to the number of revolutions of the motor M is as indicated by broken line in FIG. 3 and therefore, the motor M is rotatively driven in a forward direction by a great output. Accordingly, in spite of the low ambient temperature and the great sliding resistance (for example, $T_1$), the anchor 1 as the runner member quickly (for example, at $N_1$) comes from the liberating position to the restraining position and thus, the webbing 2 restrains the seat occupant.

In contrast, when the seat occupant opens the door to get off the vehicle, the door switch 17 becomes closed and the coil 14 is energized and thus, the contact pieces 12a and 13a come into contact with terminals 12c and 13c, respectively. Thus, the motor M is revolved in a reverse direction by a great output to thereby cause the anchor 1 to come from the restraining position to the liberating position.

Next, when the ambient temperature is high, the contact 16a of the switch 16 becomes disengaged from a terminal 16b due to its characteristic and the switch 16 becomes open. Thus, the resistor R is included in the closed loop including the switches 12, 13 and 16 and the voltage drop by the resistor R occurs, and a voltage lower than the voltage of the power source 11 is applied to the motor M. At this time, the torque characteristic relative to the number of revolutions of the motor M is as indicated by solid line in FIG. 3. Accordingly, during the forward revolution and the reverse revolution of the motor M, the motor M is driven by a small output and thus, in spite of the small sliding resistance (for example, $T_2$), the anchor 1 is moved to the restraining position or the liberating position at the same speed (for example, $N_1$) as that when the ambient temperature is low.

As described above, according to the present embodiment, the switch 16 including the bimetallic contact piece 16a is adopted and this is parallel-connected to the resistor R and therefore, the torque characteristic relative to the number of revolutions of the motor M is adjusted in accordance with the high and low of the ambient temperature. That is, during the time of low temperature when the sliding resistance of the anchor 1 is great, the output of the motor M is increased, while during the time of high temperature when the sliding resistance of the anchor 1 is small, the output of the motor M is decreased and therefore, irrespective any variation in the ambient temperature, the anchor 1 is moved always at a substantially constant speed. Accordingly, even during the time of high temperature, it will never happen that the anchor 1 is moved at a high speed and collides against a stopper or the like and is damaged thereby. Also, the introduction of the switch 16 and the resistor R leads to an advantage that an ordinary motor (a motor which does not require any special design in the construction of the brush and commutator) can be employed as the motor M.

Figure 4:
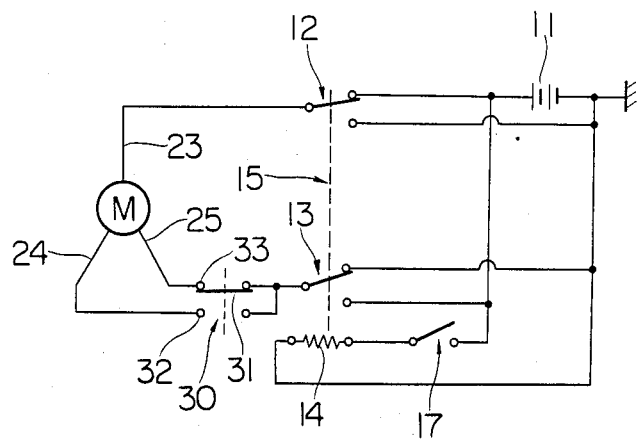
FIG. 4 is a view of an electric circuit showing a second embodiment of the present invention.

A second embodiment of the present invention will now be described by reference to FIG. 4. In FIG. 4, portions corresponding to those of the above-described first embodiment are given similar reference numerals and chiefly the portions different from those of the first embodiment will be described. The greatest differences between the two embodiments consist in the construction of the motor M and the adoption of a change-over type contact 30.

Figure 5:
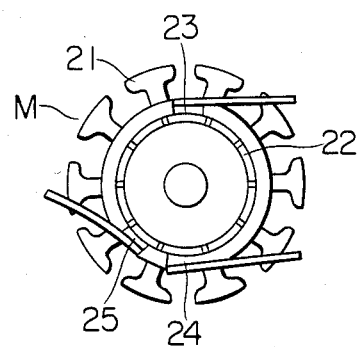
FIG. 5 illustrates the electrical portion of the motor.
Figure 6:
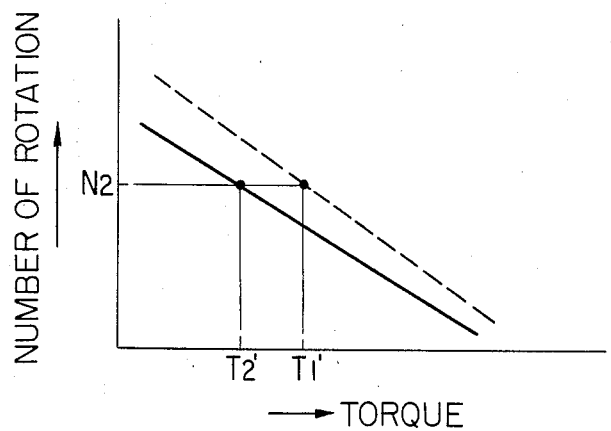
FIG. 6 is a graph showing the relation between the torque and the number of revolutions when the positions of brushes are changed.

The DC motor M, as shown in FIG. 5, has a first brush 23, a second brush 24 and a third brush 25 in slidable contact with the commutator 22 of a rotor 21 and moreover, the first brush 23 and the second brush 24 are provided in opposed relationship with the diametral direction of the commutator 22, while the third brush 25 is provided proximate to the second brush 24. In such motor M, between the time when power supply is effected by utilization of the first brush 23 and the second brush 24 and the time when power supply is effected by utilization of the first brush 23 and the third brush 25, the torque characteristic relative to the number of revolutions of the motor M is greater during the former time (broken line) than during the latter time (solid line), as shown in FIG. 6. The first brush 23 is connected to the switch 12. Also, the change-over type contact 30 has its contact piece 31 movable in response to any variation in the ambient temperature and adapted to change over to a terminal 32 connected to the second brush 24 or to a terminal 33 connected to the third brush 25.

In the present embodiment, when the ambient temperature is low, that is, when the sliding resistance is great ($T_1'$), the contact piece 31 changes over to the terminal 32 to increase the torque characteristic relative to the number of revolutions of the motor M and, when the ambient temperature is high, that is, when the sliding resistance is small ($T_2'$), the contact piece 31 changes over to the terminal 33 to decrease the torque characteristic relative to the number of revolutions of the motor M. Thus, as in the above-described embodiment, even when the ambient temperature varies, the anchor 1 is moved at a substantially constant speed (the number of revolutions $N_2$).

What has been described above is merely illustrative embodiments of the present invention and the present invention is never restricted thereto. For example, the seat belt device may be not only of the two-point type but also of the three-point type, and the electric circuit is neither limited to the ones shown in FIGS. 3 and 4.

Figure 3:
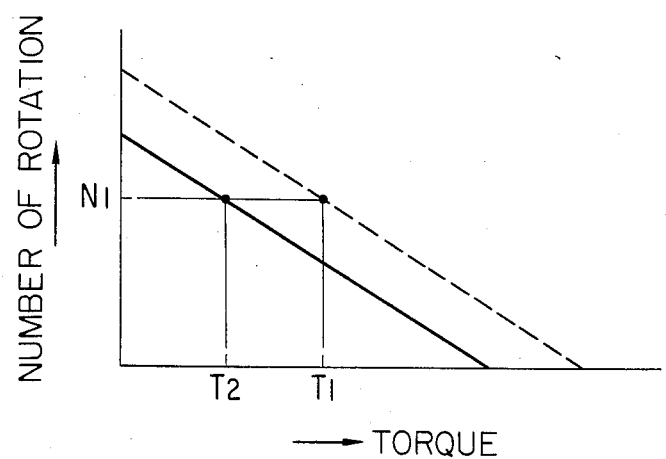
FIG. 3 is a graph showing the relation between the torque and the number of revolutions when the voltage supplied to the motor is changed.

The ambient temperature may be measured not only near the rail member but also near the motor M, and the temperature detecting means is not limited to the bimetal type. The manner in which the resistance value of the resistor R is varied is not restricted to two stages but may also be three or more stages, and the change-over of the brushes can be accomplished in three or more ways. The manner in which the torque characteristic relative to the number of revolutions of the motor M is varied is not limited to what is shown in FIGS. 3 and 6 (for example, a spring force or the like may be utilized to mechanically vary such characteristic).

According to the present invention, as has hitherto been described, means for detecting the ambient temperature and controlling the output of the DC motor for driving the runner member is provided in the electric circuit for driving the motor and therefore, the runner member may be moved always at a substantially constant speed even if the sliding resistance of the runner member is varied by any fluctuation of the ambient temperature.

I claim:

1. In a passive seat belt device in which a runner member with which a part of webbing is engaged is moved on a guide member by being driven by a driving means and thereby can assume a seat occupant restraining position and a seat occupant liberating position and a device for controlling a driving force of the driving means is provided, the controlling device includes means for detecting an ambient temperature and control means for controlling the driving force so as to be increased when the ambient temperature the detecting means detects is low and to be decreased when the ambient temperature the detecting means detects is high whereby the runner member moves on the guide member at a substantially constant speed irrespective of a change of the ambient temperature.

2. A seat belt device according to claim 1, wherein the driving means is a DC motor and the control means controls a torque characteristic relative to a number of revolutions of the DC motor.

3. A seat belt device according to claim 2, wherein the voltage supplied to said DC motor is controlled by said control means and the voltage supplied to said DC motor is rendered high when the ambient temperature is low and rendered low when the ambient temperature is high.

4. A seat belt device according to claim 3, wherein said control means includes a resistor means provided in a circuit of said DC motor and the resistance value of said resistor means is rendered great when the ambient temperature is high and rendered small when the ambient temperature is low.

5. A seat belt device according to claim 2, wherein said control means includes plural brushes provided in the motor, each pair of the brushes being opposed to each other relative to a commutator of a rotor of said DC motor and being selected according to the ambient temperature so that power is supplied to between the selected pair, and the torque characteristic relative to the number of revolutions of the motor is varied pursuant to the selection of said each pair of the brushes.

6. In a passive seat belt device including a runner member movable along a guide means, a driving means for driving the runner member between a seat occupant restraining position and a seat occupant liberating position and a device for controlling a driving force of the driving means, the controlling device includes means for detecting an ambient temperature and control means for controlling the driving force of the driving means in accordance with the ambient temperature the detecting means detects.

* * * * *